Patented June 2, 1942

2,285,183

UNITED STATES PATENT OFFICE 2,285,183

METHOD OF DRYING INK

Dominic J. Bernardi, Astoria, N. Y., assignor to Interchemical Corporation, New York, N. Y., a corporation of Ohio No Drawing. Application November 1, 1940, Serial No. 363,912

4 Claims. (Cl. 101—416)

This invention relates to the setting of inks containing prolamines, and has particular reference to a method of drying such inks which comprises treating the wet ink film with water.

It has been proposed to use solutions of prolamines (e. g. zein from corn, gliadin from wheat, etc.), dissolved in solvents substantially non-volatile at 25° C., as typographic printing inks. The solvents which have been indicated as particularly useful include the higher glycols and the polyglycols. It has been proposed to cause these inks to dry by absorption into the paper, and by heating to volatilize the ink, as taught by the Gessler U. S. Patent No. 2,087,190, issued July 13, 1937.

I have discovered that these inks may be dried instantaneously by treating the ink film with water; the water mixes with the solvent of the ink, and the prolamine immediately forms an irreversible dry gel or precipitate.

Very little water is needed for this setting action, since the prolamine becomes insoluble when the solvent contains even as little as 50% or less of water. As a result, the water needed is readily absorbed by the paper or other imprinted surface, and no provision need be made for its removal.

Typical inks which may be used include the following:

Example 1

| | Parts by weight |
|---|---|
| Varnish | 53.00 |
| Titanium dioxide | 28.00 |
| Phthalocyanine blue | 1.70 |
| Blue toner | 5.70 |
| Alkali blue | .90 |
| Lecithin | 1.80 |
| Diethylene glycol | 8.90 |

The varnish is made of—

| | Parts by weight |
|---|---|
| Phenol aldehyde resin | 4.00 |
| Zein | 20.00 |
| Diethylene glycol | 76.00 |

Example 2

| | Parts by weight |
|---|---|
| Varnish | 67.20 |
| Titanium dioxide | 21.00 |
| Blue toner | 7.20 |
| Syan blue | 2.10 |
| Alkyl aryl sulfonate | 1.05 |
| Paraffin wax | 1.05 |
| Ionone #21 (deodorant—$C_{13}H_{20}O$) | .40 |

The varnish is made of—

| | Parts by weight |
|---|---|
| Zein | 13.65 |
| Durez 525 (alcohol-soluble phenol formaldehyde resin) | 6.85 |
| Talloil | 6.85 |
| Diacetin | 72.65 |

Example 3

| | Parts by weight |
|---|---|
| Varnish | 49.00 |
| Titanium dioxide | 31.82 |
| Alkali blue | 2.90 |
| Blue toner | 4.90 |
| Lecithin | .99 |
| Essowax (paraffin wax) | .49 |

The varnish is made of—

| | Parts by weight |
|---|---|
| Zein (corn prolamine) | 20.00 |
| Diacetin | 80.00 |

The prints may be treated with water applied by an intaglio roller, or they may merely be subjected to a spray of water or a jet of steam. It is desirable that only so much water be added as can be absorbed by the printed surface; as pointed out, very small quantities are needed.

The solvent used for the prolamine may be any water-miscible solvent which is substantially non-volatile at ordinary room temperatures (ca. 25° C.), and which will dissolve the prolamine. The most common solvents are the higher glycols (e. g. propylene glycol and higher) and the polyglycols (e. g. diethylene glycol); diacetin has been suggested by certain of my coworkers, and is satisfactory.

As indicated by the examples, resins and other film-forming ingredients may be blended with the prolamines; and any of the various prolamines can be used. Zein from corn is particularly useful and commercially available; gliadin from wheat, hordein from barley, and other similar prolamines may also be used.

I claim:

1. The method of setting a film of typographic printing ink containing a prolamine dissolved in a water-miscible solvent substantially non-volatile at 25° C., which comprises adding to the ink film sufficient water to precipitate the prolamine in the form of an irreversible gel.

2. The method of setting a film on paper of typographic printing ink containing a prolamine dissolved in a water-miscible solvent substantially non-volatile at 25° C., which comprises adding to the ink film sufficient water to precipitate the prolamine in the form of an irreversible gel, while holding the total quantity of water at such a low point that the water can all be absorbed by the paper.

3. The method of setting a film of typographic printing ink containing zein dissolved in a water-miscible solvent substantially non-volatile at 25° C., which comprises adding to the ink film sufficient water to precipitate the zein in the form of an irreversible gel.

4. The method of setting a film on paper of typographic printing ink containing zein dissolved in a water-miscible solvent substantially non-volatile at 25° C., which comprises adding to the ink film sufficient water to precipitate the zein in the form of an irreversible gel, while holding the total quantity of water at such a low point that the water can all be absorbed by the paper.

DOMINIC J. BERNARDI.